May 8, 1928.  R. R. FISHER  1,668,639
WATER HEATER
Filed June 6, 1925   2 Sheets-Sheet 1

Inventor
R. R. Fisher
By Marks Clerk
Attys.

May 8, 1928.

R. R. FISHER

WATER HEATER

Filed June 6, 1925

Inventor
R. R. Fisher
By Marks & Clerk
Attys.

Patented May 8, 1928.

1,668,639

UNITED STATES PATENT OFFICE.

RAYMOND ROYLE FISHER, OF DUNEDIN OTAGO, NEW ZEALAND.

WATER HEATER.

Application filed June 6, 1925. Serial No. 35,380.

This invention relates to water heaters and water heating systems.

The object of this invention is to practically ensure a speedy supply of a limited quantity of very hot water without partly heating the whole of the water in the vessel.

The method embodies a particular circulation of water.

This is accomplished by delaying progress of circulation as hereinafter described, and concentrating the heat as far as possible in a portion of the water in the vessel, so that the water so heated may be drawn off without appreciable undue loss of temperature and without the ingress of colder water, materially affecting the temperature of the hot water in the chamber. Thus a constant supply of hot water according to the heat available is provided, enabling successive hot baths to be obtained, or a supply of hot water for other purposes.

The invention broadly contemplates constructing and erecting a circulator in two or more vessels, superimposed with a space, with or without insulating material therein, between each two vessels, and the creation of circulation between waters in each vessel, means being provided whereby water once heated may be drawn from the lower cylinder or portion thereof irrespective of the temperature of the water in the upper vessel.

Referring to the accompanying drawings, which illustrate one constructional embodiment of the invention, Figure 1 is a diagrammatic front elevation of the invention, the superimposed vessels, and circulation pipes shown in section; the arrow heads indicate the direction of circulation of the water due to increased temperature.

Figure 1:
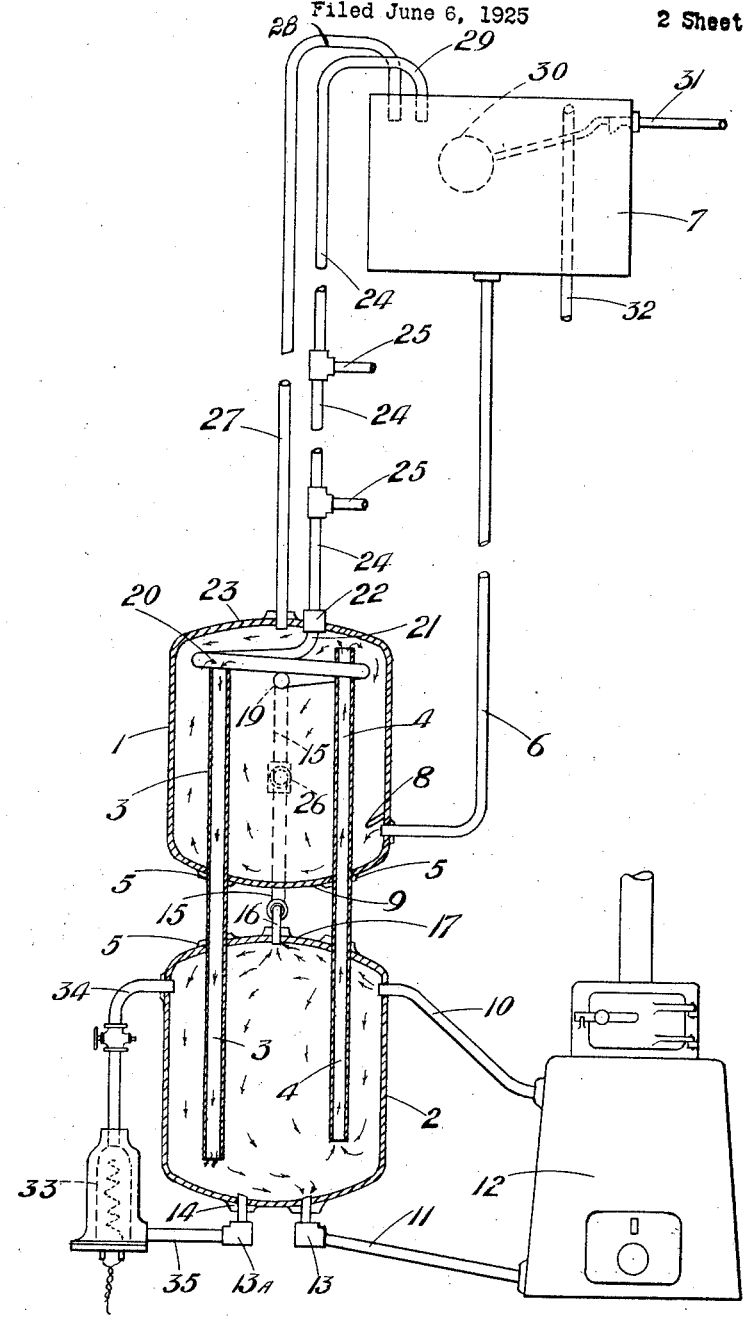
Figure 2:
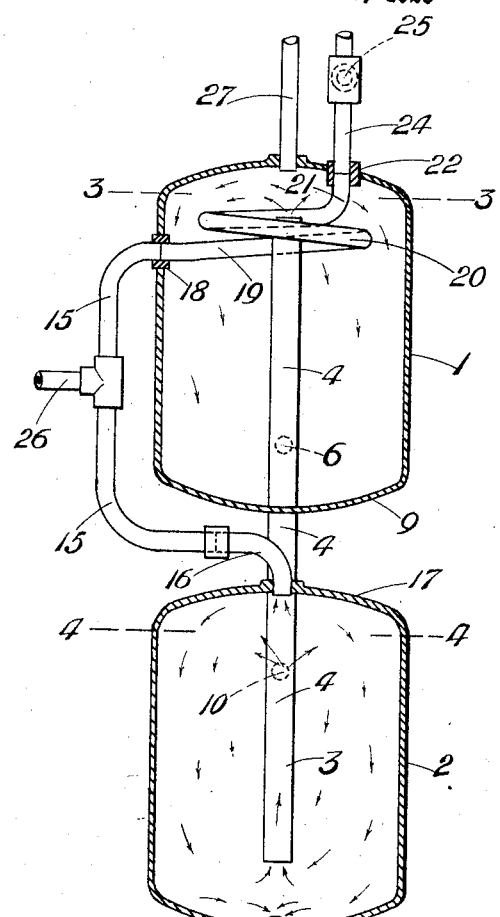
Figure 2 is a side sectional elevation of the invention, showing the superimposed vessels; the arrow heads shown indicate the direction of flow of current; the heater unit and the water supply cistern are omitted.
Figures 3, 4:
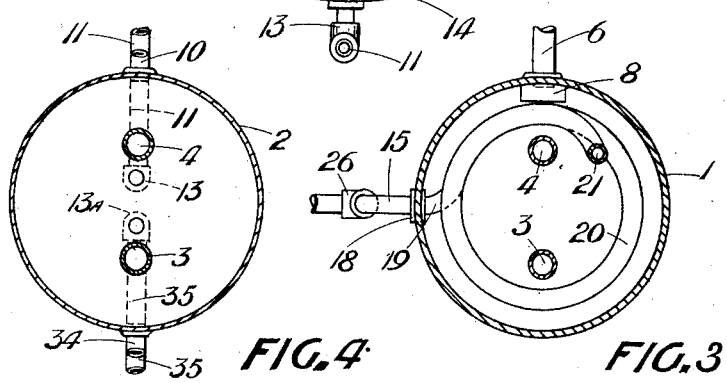
Figure 3 is a sectional plan through line 3—3, Figure 2.
Figure 4 is a sectional plan through the line 4—4 on Figure 2.

In the construction shown in the drawings there are provided two vessels 1 and 2 made of any suitable metal, preferably of the same dimensions and having a space between them to prevent induction. These vessels 1 and 2 are secured and connected together by two pipes 3 and 4 of preferably equal length, extending from near the top of vessel 1 to near the bottom of vessel 2, the end of one pipe 4 being disposed slightly nearer the top of vessel 1 than the end of the other pipe 3, to provide for inter-circulation between the vessels 1 and 2, the colder water descending through the lower disposed pipe 3, and hot water ascending upwardly through pipe 4. These pipes 3 and 4 are preferably of the same internal diameter, and are vertically disposed at preferably equal distances respectively from the sides of the vessels. The pipes 3 and 4 are brazed, soldered or otherwise, secured to fittings 5 where they enter the vessels 1 and 2 to rigidly connect the said vessels. The supply pipe 6 from the cistern 7 enters the vessel 1 near its lower end, and is preferably provided with a baffle plate or deflector 8, to direct the flow of water towards the bottom 9 of said vessel 1.

The vessel 2 is provided with circulation pipes 10 and 11 respectively which lead to the water heating unit 12, which may be of any approved type. An elbow fitting 13 secured to the bottom 14 of the vessel 2 is provided for the attachment of the pipe 11. The cooler water in vessel 2 is introduced into the water heating unit 12 through pipe 11, which is located at or near the bottom 14 of vessel 2 and after being heated in the heating unit 12, is reintroduced into said vessel 2, through pipe 10 which is connected to the vessel at a point near the upper part thereof.

A draw off pipe 15 secured to the fitting 16 which is attached to the top 17 of the vessel 2 is led round the bottom of vessel 1 and up the side thereof, and introduced into said vessel 1 at the upper part thereof, the upper end of pipe 15 being secured to the fitting 18 attached to the vessel 1. To the inner end of the fitting 18 is attached one end 19 of the pipe 20; the opposite end 21 of the pipe 20 is led upwards and secured to the fitting 22 secured to the top 23 of the vessel 1. The pipe 20 is preferably coiled as shown on the drawings to increase the heating surface. To the outer end of the fitting 22 is attached a pipe 24 which is provided with any required number of reticulation branches 25 supplied with suitable cocks. The pipe 15 may be provided with a draw off fitting 26 and supplied with a suitable cock.

This draw off pipe 15 need not necessarily be introduced into the upper part of vessel 1 but may be dispensed with and a draw off cock provided in the upper part of vessel 2. Leading the draw off pipe through the upper part of vessel 1 however tends to "preheat" the colder water in the top portion thereof with resultant reduction in the time required to heat the water by the heating unit.

A suitable exhaust pipe 27 is provided extending preferably centrally through the top 23 of the vessel 1. This exhaust pipe 27 and the pipe 24 may be led to the water supply cistern 7 through extended portions 28 and 29 respectively.

The cistern 7 is provided with a ball cock 30 and pipe 31, leading from the source of supply and a suitably arranged overflow pipe 32 is provided near the top of the cistern 7.

A reserve electrical heating unit 33 may be employed and is preferably attachable by circulation pipes 34 and 35 to the vessel 2, the pipe 34 being attached to the upper part of vessel 2 opposite the pipe 10, and the pipe 35 entering the vessel 2 by attachment to the elbow fitting 13ᴬ.

The heating unit may be supported in any suitable manner known to the art.

In operation firstly, the system is supplied with water from the source of supply until the level of the water in the pipes 27 and 24 is equal to the level of the water in the supply cistern 7, when the ball cock is the said cistern 7 shuts off the water from the source of supply, and automatically maintains the said level. If the source of heat is wood, coal or coke, a fire is lighted in the heater unit, which is jacketed to form a water space, to have one of the walls of the said jacketed space in direct contact with the heating surface surrounding the grate area of the said heater unit.

As the temperature of the water in the heater increases, it rises through the pipe 10 to the highest part of vessel 2, replacing simultaneously colder water drawn from the lower part of the said vessel 2 to the heater through the pipe 11, due to displacement by circulation.

As the temperature of the water increases at the point of heat concentration, i. e. the junction of the pipe 10 with the vessel 2, more water is heated and the cycle of circulation recurs, the increase of temperature gradually descends heating the volume of water in the chamber 2, in a downwardly direction, and the portion of colder water at the bottom of the said chamber 2 increases in temperature until the hot water level falls below the lower extremity of the circulation pipe 4, which according to experiment occurs, when the temperature of the water at the point of heat concentration is at approximately 160° F.

When this occurs, a portion of the hot water rises through the said circulation pipe 4 to the top of chamber 1, displacing an equal quantity of colder water, which gravitates downwards through the circulation pipe 3, to replace the water passing from the bottom of vessel 2 to vessel 1, through the said pipe 4, and eventually the said colder water passes into the heater unit through the pipe 11, and upon the temperature in the said unit increasing, the water exudes from the pipe 10 into the vessel 2, at the point of heat concentration, and so the cycle of circulation proceeds, and the heater unit continues to increase the temperature of the water discharged from the bottom of the vessel 2, and the water continues, exuding at the point of heat concentration at the top of vessel 2, gradually increasing the temperature of the water below it, until nearly the whole of the contents of the lower vessel 2 are boiling.

While this is taking place, circulation continues through the medium of pipes 3 and 4, increasing the volume of hot water in the upper vessel 1, if nothing is done to interrupt the accumulative effect; that is to say, no hot water is drawn off, then all the water in the cistern will be brought to boiling point, first in the lower 2, and then in the upper vessel 1.

Boiling commences at the point of heat concentration in the said lower vessel 2, and in the upper part of vessel 1, that is, in each case at the top of each vessel. The steam generated escapes from the vessel 2 through the draw off pipe 15, coil 20 and pipe 24, and the heat units given off by the coil are utilized to supplement the heat dispersed by the heater unit, and to further assist the said unit, supplements by preheating the water in the supply cistern, due to the escape of steam or overflow of boiling water through the pipe 24 or the exhaust pipe 27 from the vessel, the outlets of which are over the said supply cistern 7.

Hot water is drawn off from the point of heat concentration in the lower vessel 2, through the main draw off pipe 15, and the extension 24 thereof, if higher reticulation is desired; that is to say, a supply of water for the first and second floors is drawn through the reticulation branch pipe 25 of the extension 24, for the lower level a withdrawal may be made through the branch pipe 26.

As above stated these withdrawals are from the top of the lower vessel 2, this being the hottest water in the system. During the withdrawal, the water is being replaced by the supply from the top of the vessel 1, which is the hottest water in the said vessel, thus supplying the lower chamber 2 with pre-heated water, and the fresh supply of water to replace the withdrawal from the said upper chamber 1 is supplied through the pipe 6 from the supply cistern 7, which is described above as having been preheated, due to the escapment of steam or overflow of boiling water.

The method concentrates the heat in the number of gallons to be utilized, and does not bring to a lower temperature a larger quantity of water than is required, thus heating sufficient water for a bath to a high temperature in a short time, due to heat concentration; first in the lower vessel 2, at the point where the pipe 10 couples with the said vessel, and second, in the upper vessel 1, at the point where the water exudes from the pipe 4, after circulation sets up with the lower vessel 2, thus besides a supply of limited quantity of hot water from the upper part of the lower vessel without the necessity of partly heating the whole of the water in the system, there is a supply of a limited quantity at a slightly lower temperature; and further, after the commencement of circulation between the vessels, only preheated water enters the heater unit.

What I claim as new and desire to secure by Letters Patent is:—

1. Apparatus for heating water of the character described, including a plurality of superimposed vessels, means for heating the water in the lower of said vessels, circulating means between the vessels arranged to produce a thermo-siphonal effect for heating the water in the adjacent upper vessel when the temperature in the lower vessel reaches a predetermined degree, a drawing-off pipe having junction with the crown of the lower vessel providing a drawing-off part in contact with the portion of water first heated due to concentration, an extension from said drawing-off pipe having a portion thereof junctioning with, and passing into the interior of the higher vessel near the top thereof; the interior portion of the extension being coiled and junctioned with the crown of the said higher vessel, to project to the exterior of the said higher vessel, a supply cistern the said extension projecting upwards and terminating over the supply cistern and reticulation branches between the last mentioned junction and terminating point, substantially as and for the purposes set forth.

2. In a hot water circulator, as claimed in claim 1, the higher vessel having comunication with the water supply cistern, the point of connection of the said comunication being at or near the bottom of the said higher vessel, for the purpose described.

In testimony whereof I have hereunto set my hand.

RAYMOND ROYLE FISHER.